Dec. 27, 1955  W. J. VAN WYE  2,728,262
APPARATUS FOR INSPECTING TIN PLATE
Filed May 16, 1952
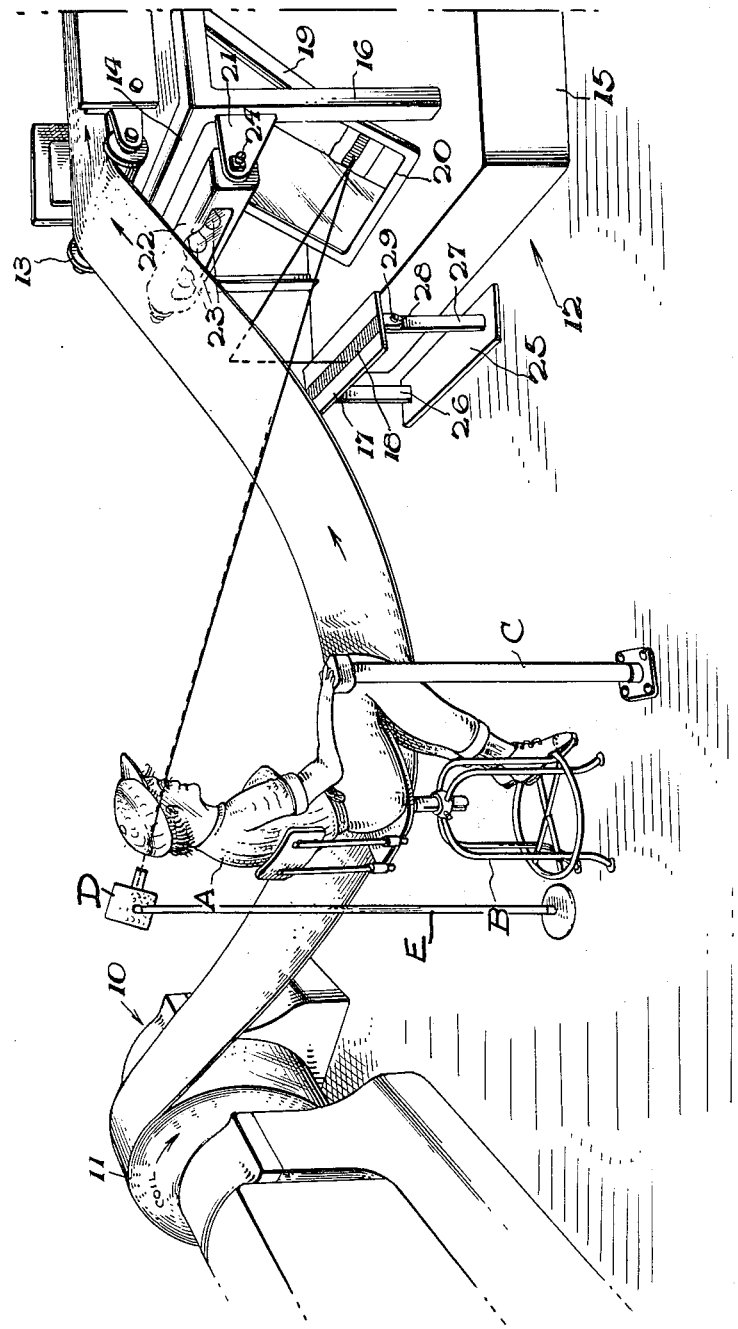
INVENTOR
William J. Van Wye.
BY
ATTORNEY

United States Patent Office 2,728,262
Patented Dec. 27, 1955

2,728,262

APPARATUS FOR INSPECTING TIN PLATE

William J. Van Wye, Niles, Ohio, assignor to Republic Steel Corporation, Cleveland, Ohio, a corporation of New Jersey Application May 16, 1952, Serial No. 288,242

5 Claims. (Cl. 88—14)

The present invention relates to the visual inspection of travelling sheets in strip form, which are unwound and conveyed by an inspection station under control of an inspector.

This inspection is a part of a processing line, generally a cutting line, wherein the strip is cut into predetermined lengths and piled ready for packaging and shipment. This line may consist of part or all of the following: Uncoiler, visual inspection, electronic inspection, leveller, rotary shear, classifier pilers and recoiler. The product handled by this line can be any continuous strip of any material that can be wound into a coil, and which requires inspection before additional processing or shipment.

The function of the visual inspector is to see any defect on the top or bottom surfaces of the strip or any plating or coating that may be on the strip that is not up to a predetermined standard. This defective part of the strip, which is cut into lengths just as the prime part is, is then rejected into a separate pile at the classifier. The reject gate on the classifier is under the control of the inspector. Also, if the coil is being inspected and recoiled without cutting into lengths, the inspector controls a mechanism inserting a marker or some other means of identifying and locating the defective part of the coil.

The present invention is directed to an apparatus for visually determining the flaws in tin plate including the detection of pin holes in the strip. This apparatus also is connected to control the reject gate in the classifier, and the defective cut lengths are automatically rejected to the reject pile.

The inspection station and control is located in such a way that the inspector can see the top surface of the strip and by the use of a mirror the bottom surface can also be seen simultaneously without the inspector moving his head. However, the inspector's eyes must and do quickly alternately focus on the top surface of the moving strip and the mirror; thereby both sides of the moving strip are inspected practically simultaneously. Directly any defect is seen either on the top surface of the strip or in the mirror which is the image of the bottom surface, the inspector presses the reject button and the defective cut lengths are rejected into the reject pile at the classifier.

From the foregoing, which is a general description of the operation involved, it can be readily understood that any device that will minimize the eye strain for the inspector will also increase his efficiency.

Accordingly, the invention includes in its objects for inspecting both sides of strip plate, the provision of a visual contrast gage for assisting and facilitating the human eye to more readily and accurately detect the flaws in a fast moving strip of tin or the like, to thereby maintain continuous and speedy operation.

A further object is to provide a novel optical system for the under side of the plate utilizing the mirror-like reflecting properties of prime tin plate for receiving and projecting the illuminated image of comparison plate having a bright surface of a reflecting identity approximating coated tin plate and a contrasting black line more closely approaching uncoated tin plate to the reflecting surface of a mirror placed in the line of vision of an inspector seated at a plate feeding control station, while simultaneously said mirror also receives an image of the said tin plate surface adjacent the said comparison plate.

The description should be read with reference to the accompanying drawing, wherein:

The figure is a schematic perspective view of one proposed arrangement for practicing this invention.

In general, according to the present invention, a beam of light is directed to completely illuminate across the full width of the underside of the moving strip. A mirror is provided to reflect the image of the underside of strip to the inspector, the angle and elevation of the mirror are made readily adjustable relative to the floor or strip. This is done to provide for the change in catenary of the strip loop and the physical comfort of the inspector.

A comparison plate is provided consisting of a black strip similar in appearance to uncoated tin plate, said black strip being on a contrasting color background similar in appearance to coated tin plate. The finish on this comparison plate is dull (Matt) so that it does not reflect stray light beams. The angle, elevation and location of this comparison plate is readily adjustable relative to the floor or strip.

The mirror and comparison plate are then adjusted so that the image of the comparison plate is reflected by the underside of the moving strip onto the mirror and again reflected by the mirror to the eyes of the inspector.

Any defect and resulting change in the reflecting properties of the surface of the moving strip is noticed with less eye strain as the image consists of a reflection by the underside of the moving strip of the two contrasting surfaces on the comparison plate.

By way of illustration, the drawing includes a power driven pay off reel 10 for initiating the unwinding therefrom of a coil 11 of sheet strip plated metal, such as a tin plate. The plated surface of the strip to be inspected as it is unwound has a coated surface facing downward and extends over a predetermined area of floor space 12 to an idler roller 13 on an end of a conveyor and inspection table 14 and onto a collector reel, not shown. The conveyor table 14 may be positioned on a platform 15, and if desired may be provided with adjustable legs 16, to thereby regulate the slack or droop of the fast travelling tin plate strip 11 with respect to the floor space 12 during inspection.

Located beneath the upward reach of the plated surface of strip 11 is a bright metal comparison plate 17 with an elongated longitudinal center line 18 of contrasting color, such as black or of a relatively dull shade approximating uncoated tin. As the underside of the tin plate strip passes over the comparison plate 17 the image received thereon with the black line 18 is reflected to a mirror 20 mounted for angular adjustment on a bracket 19 under and between the legs 16 of the table 14.

Mounted above the reflecting surface of the mirror on supports 21, is a light projecting hood 22 with a light source comprising a plurality of electric light bulbs 23. The hood is formed with a light emitting opening and is pivoted on pins 24 for adjustment, to thereby project light rays across the surface of the image receiving and projecting underside of the tin plate strip in the path of the light rays and to provide for illumination of the comparison plate 17 simulating coated plate and the black line 18 simulating uncoated tin plate thereon for comparison between the illuminated reflected images of the said comparison plate, line 18 and the reflected underside of the tin plate strip in the mirror. Also while inspecting the underside of the coated or plated strip, the inspector may simultaneously train his eyes on the upper side of the plated strip for possible breaks or defects in the strip coating.

The comparison plate 17 is part of a mobile unit including a base 25 having a pair of vertical spaced apart standards 26 and 27 formed at each free end with a pivot pin opening. The bottom surface of the comparison plate 17 is formed with spaced apart vertically depending apertured lugs 28 for cooperation with the opening in each standard 26 and 27 which may be telescopically adjustable. Thus the angle, elevation, and location of the comparison plate is readily adjustable relative to the floor or strip.

The mirror 20 and the comparison plate 17 are visible to the inspector A seated on a chair B placed in floor space 12 to the side of the strip. An electric push-button switch control tower or standard C is provided at the operator's station B and is connected by electric leads, not shown to the instrumentalities heretofore mentioned to manipulate the strip material.

Also, a motion picture camera D mounted on standard E has its lens directed toward the upper side of the plate and the mirror to photograph both sides of the strip or plate, as shown by dotted and solid lines respectively and thus provide a permanent record of the surface conditions on both sides of the plate.

Operation

The method of practicing the present invention is to first extend the leading portion of the strip to be inspected from a coil 11 thereof on the pay-off reel across the floor 12 over roller 13 onto a take-up reel. This exposes the underside of the plated strip to the light beam from reflector 22 and a portion of the image of comparison plate 17 with its contrasting line 18 is received and projected with a part of the image of the plated surface of the strip 10 to the mirror 20. The image of the plate 17, line 18 and the under surface of the strip 10 are all clearly visible to the inspector A when he looks at the lower side of the strip in the mirror.

The inspector may control the speed of travel of the strip by having low, high and medium speed button controls electrically arranged in any suitable manner in the control standard C.

As the strip feeds forward over the inspection units the inspector's eyes may quickly alternately focus on the top surface of the moving strip and the mirror 20. The contrast between the image of the black line and the brighter images of the plate and the strip being inspected enables the inspector to judge the quality of the finish with less eye strain than heretofore with prior known methods.

Thus there is provided a novel system of visual or sight inspection of tin plate or the like including the novel method of utilizing the material being inspected as an element of the apparatus used to practice the invention and, whereby, the inspector may efficiently compare both surfaces of a continuous tin strip with accuracy and efficiency, and the camera will provide a permanent record of surface conditions on the strip.

I claim:

1. In an apparatus for visually inspecting opposite surfaces of a plated metal strip or the like from a single inspection station, where the inspector's normal line of vision is above the upper side of the strip, a comparison plate of a predetermined standard brightness similar to plated metal strip having a contrasting line thereon similar to defective or non-plated strip supported below the underside of the strip, a light source for projecting light upon the underside of the plated surface of the strip and upon the surface of the comparison plate, said underside of said strip serving as an image receiving and projecting surface for said comparison plate and the reflection of the adjacent area of said underside of the strip, and a mirror also in the light adjustably supported to simultaneously receive the combined images of the underside of the plated strip and the image of the comparison plate to permit visual comparison by the inspector alternately of the directly visible upper side of the plated strip and of the said mirror reflected combined adjacent images, to thereby compare the strip surfaces with the comparison plate to detect flaws in the respective upper and lower plated strip surfaces.

2. In the apparatus described in claim 1, wherein the same includes an inspector-controlled strip feeding means for conveying said plated strip over the said comparison plate, light source and mirror.

3. In an apparatus for visually inspecting opposite surfaces of a plated metal strip or the like from a single inspection station, where the inspector's normal line of vision is above the upper side of the strip, a comparison plate of a predetermined standard brightness similar to plated metal strip having a contrasting line thereon similar to defective or non-plated strip supported below the underside of the strip, a light source for projecting light upon the underside of the plated surface of the strip and upon the surface of the comparison plate, said underside of said strip serving as an image receiving and projecting surface for said comparison plate and the reflection of the adjacent area of said underside of the strip, a mirror also in the light adjustably supported to simultaneously receive the combined images of the underside of the plated strip and the image of the comparison plate to permit visual comparison by the inspector alternately of the directly visible upper side of the plated strip and of the said mirror reflected combined adjacent images, to thereby compare the strip surfaces with the comparison plate to detect flaws in the respective upper and lower plated strip surfaces, inspector controlled strip feeding means for conveying said strip over the said comparison plate, light source and mirror, and an inspector station having a push-button control standard positioned adjacent the longitudinal edge of the strip and in front of said mirror adapted to stop the strip feeding mechanism when a flaw is detected.

4. In an apparatus for inspecting both sides of strip tin plate, a pay-off reel for a coil of tin plate in strip form, means for conveying the strip forward from the said reel over a conveyor table, a comparison plate of predetermined brightness having a centrally disposed relatively dull line, said plate being mounted adjacent the strip of tin plate below the end of said table, a light reflector supported on an end of the table below said strip and above said plate including a source of light therein for directing a beam of light onto the comparison plate and the undersurface of the said strip, said strip on its illuminated surface receiving the image of said illuminated comparison plate with said dull line, a mirror supported by said table below said light reflector and the underside of said strip adapted to receive the combined images of the underside of said strip and of the comparison plate projected thereon and to said mirror, and an inspector station above and in front of said mirror for seating a tin plate inspector.

5. An apparatus for visually inspecting and recording the surface conditions on both sides of a moving metal strip, comprising, in combination a light source for projecting light upon the underside of the plated surface of the said strip, said underside of said strip serving as an image receiving and projecting surface, a comparison plate of a predetermined standard brightness simulating a plated surface having a contrasting line thereon simulating a non-plated surface supported below the strip also in the path of said light, whereby the image thereof is received on the under surface of said strip, a mirror adjustably supported to simultaneously receive the compound images of the underside of said strip and the image of said comparison plate to permit visual inspection by focusing the eyes alternately on the upper side of the strip and on the mirror to compare the strip surface with the comparison plate to detect flaws in the strip surface, and a motion picture camera having its lens directed toward the upper side of the strip and the mirror to photograph on one film strip the surface conditions on both sides of the strip.

References Cited in the file of this patent

UNITED STATES PATENTS

| | | |
|---|---|---|
| 2,015,730 | Rosin et al. | Oct. 1, 1935 |
| 2,247,047 | Bishop, Jr. | June 24, 1941 |
| 2,502,469 | Martin | Apr. 4, 1950 |